(12) United States Patent
Tanaka et al.

(10) Patent No.: US 9,010,866 B2
(45) Date of Patent: Apr. 21, 2015

(54) COVER MEMBER FOR UPHOLSTERY SHEET END REGION AND VEHICLE SEAT DEVICE WITH COVER MEMBER

(75) Inventors: Yoshio Tanaka, Lincoln, NE (US); Tyler Mencl, Lincoln, NE (US); Nick Miller, Pickrell, NE (US)

(73) Assignee: TS Tech Co., Ltd., Saitama (JP)

( * ) Notice: Subject to any disclaimer, the term of this patent is extended or adjusted under 35 U.S.C. 154(b) by 148 days.

(21) Appl. No.: 13/611,548

(22) Filed: Sep. 12, 2012

(65) Prior Publication Data
US 2013/0099549 A1 Apr. 25, 2013

Related U.S. Application Data

(60) Provisional application No. 61/549,789, filed on Oct. 21, 2011.

(51) Int. Cl.
A47C 7/26 (2006.01)
B60N 2/58 (2006.01)

(52) U.S. Cl.
CPC .................................... B60N 2/5825 (2013.01)

(58) Field of Classification Search
CPC .......... A47C 31/11; A47C 4/028; A47C 4/02; A47C 7/02; B60N 2/70; B60N 2/58
USPC .......... 297/218.3, 218.5, 218.2, 219.1, 218.1, 297/452.57, 452.58, 452.59
See application file for complete search history.

(56) References Cited

U.S. PATENT DOCUMENTS

| 4,566,735 A * | 1/1986 | Frobose .................... 297/452.46 |
| 8,240,759 B2 * | 8/2012 | Hobl et al. .................. 297/218.1 |
| 2006/0113764 A1 * | 6/2006 | Tracht ......................... 280/730.2 |
| 2008/0231104 A1 | 9/2008 | Honma |
| 2012/0001464 A1 * | 1/2012 | Teoh et al. ................. 297/218.1 |

FOREIGN PATENT DOCUMENTS

JP  2008-230346 A  10/2008

* cited by examiner

*Primary Examiner* — David R Dunn
*Assistant Examiner* — Jody Giacoman
(74) *Attorney, Agent, or Firm* — Carrier Blackman & Associates, P.C.; Joseph P. Carrier; Jeffrey T. Gedeon

(57) ABSTRACT

A vehicle seat device includes a seat base, an upholstery sheet covering the sheet base, and a cover member covering an end region of the upholstery sheet. The cover member includes a cover body of a soft material fastenable to the seat base by a fastener in covering relation to the end region of the upholstery sheet, a first lip formed by bending one side of the soft material inwardly, and a second lip formed by bending another side of the soft material inwardly. The first lip and the second lip at least partly cover a portion of the cover body where the fastener is to be positioned.

10 Claims, 11 Drawing Sheets

COVER MEMBER FOR UPHOLSTERY SHEET END REGION AND VEHICLE SEAT DEVICE WITH COVER MEMBER

CROSS-REFERENCE TO RELATED APPLICATION

This application is based upon and claims the benefit of priority from U.S. Patent Application No. 61/549,789 filed on Oct. 21, 2011, of which the contents are incorporated herein by reference.

BACKGROUND OF THE INVENTION

1. Field of the Invention

The present invention relates to a cover member for covering the end region of an upholstery sheet for a seat base, and a vehicle seat device with a cover member.

2. Description of the Related Art

One seat device for use in vehicles is disclosed in Japanese Laid-Open Patent Publication No. 2008-230346, for example.

As shown in FIG. 9 of the accompanying drawings, the disclosed seat device, denoted by 100, has a seat base 106 including a plate 102 and a cushioning member 104 and an upholstery sheet 108 covering the cushioning member 104. The upholstery sheet 108 includes an end region 108a fastened to a rear surface (plate 102) of the seat base 106 by a plurality of fasteners 110 such as staples or the like.

SUMMARY OF THE INVENTION

When the end region 108a of the upholstery sheet 108 is fastened by the fasteners 110, the end region 108a tends to undulate along the array of fasteners 110, forming a wavy edge 112. If the end region 108a with the wavy edge 112 and the fasteners 110 are visible externally, the seat device 100 is likely to be aesthetically impaired.

One solution is, as shown in FIG. 10 of the accompanying drawings, to cover the end region 108a with a cover member 120 of resin or metal which is shaped along the edge of the plate 102, i.e., the end region 108a of the upholstery sheet 108, and which is fixed to the plate 102.

Since the cover member 120 conceals the end region 108a of the upholstery sheet 108 and the fasteners 110, the cover member 120 is effective to make the seat device 100 aesthetically pleasing.

However, the cover member 120 is liable to increase the cost with which to manufacture the seat device 100 because a mold assembly is required to produce the cover member 120. In addition, the cover member 120 lacks versatility in use, i.e., cannot be used as a general-purpose product, as it is a dedicated product fixedly shaped along the edge of the plate 102. Moreover, if the plate 102 happens to be misshaped due to a dimensional error of the plate 102, the cover member 120 which is rigid itself cannot be deformed into alignment with the edge of the plate 102, possibly allowing the wavy edge 112 of the end region 108a of the upholstery sheet 108 to visible externally.

The above problem may be solved by, as shown in FIG. 11 of the accompanying drawings, using a cover member 130 made of soft rubber or the like. The cover member 130 is placed in covering relation to the end region 108a of the upholstery sheet 108 and fastened, together with the end region 108a of the upholstery sheet 108, to the plate 102 by the fasteners 110. The cover member 130 is of a U-shaped cross section to conceal the fasteners 110 from external view.

Since the cover member 130 is made of soft rubber or the like, it can easily be brought into alignment with the edge of the plate 102. However, the cost with which to fabricate the seat device 100 may be increased because the process of fastening the cover member 130 with the fasteners 110 includes turning up an edge portion of the cover member 130 to gain access to the positions where the fasteners 110 are to be hammered in.

The present invention is made in view of such problems. It is an object of the present invention to provide a cover member which reliably covers a wavy edge of the end region of an upholstery sheet and fasteners to make a seat device aesthetically pleasing, which is versatile in use, and which allows the seat device to be manufactured at a reduced cost, and a vehicle seat device which incorporates such a cover member.

According to an aspect of the present invention, there is provided a cover member for covering an end region of an upholstery sheet covering a sheet base, the cover member having the following features [1] through [5]:

[1] The cover member includes a cover body of a soft material fastenable to the seat base by a fastener in covering relation to the end region of the upholstery sheet, a first lip formed by bending one side of the soft material inwardly, and a second lip formed by bending another side of the soft material inwardly, wherein the first lip and the second lip at least partly cover a portion of the cover body where the fastener is to be positioned.

[2] In the cover member having the feature [1], the first lip is formed by further bending the one side of the soft material toward the cover body, the second lip is formed by further bending the other side of the soft material toward the cover body, the first lip is folded on itself into overlapping layers of the soft material which are stitched to the cover body, and the second lip is folded on itself into overlapping layers of the soft material which are stitched to the cover body.

[3] In the cover member having the feature [2], the first lip and the second lip are capable of contacting each other.

[4] In the cover member having the feature [3], the soft material is made of the same material as that of the upholstery sheet.

[5] In the cover member having the feature [1], the soft material comprises PVC leather.

According to another aspect of the present invention, there is provided a vehicle seat device including a seat base, an upholstery sheet covering the sheet base, and a cover member covering an end region of the upholstery sheet, wherein the cover member comprises a cover member having either one of the above features [1] through [5].

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Cover members for covering the end region of an upholstery sheet and vehicle seat devices incorporating such cover members according to preferred embodiments of the present invention will be described in detail below with reference to the accompanying drawings.

Figure 1:
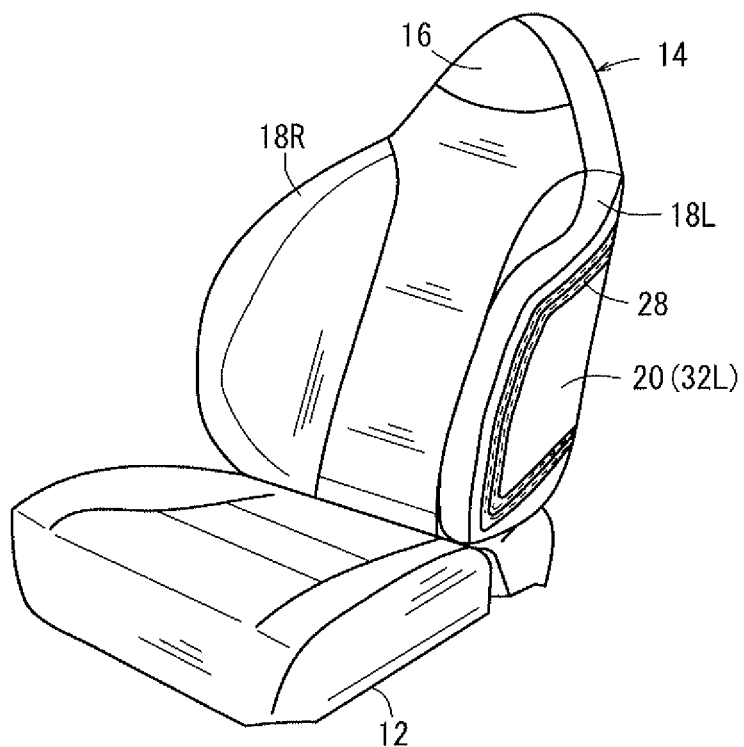
FIG. 1 is a perspective view of a vehicle seat device incorporating a cover member for covering the end region of an upholstery sheet according to an embodiment of the present invention.

A seat device 10 (see FIG. 1) according to an embodiment of the present invention is used as a driver's seat in an automobile (vehicle). As shown in FIG. 1, the seat device 10 includes a seat cushion 12 mounted on a vehicle body (not shown) for supporting the hip and thighs of the driver, and a seat back 14 mounted on a rear end of the seat cushion 12 for supporting the back of the driver.

The seat back 14, whose upper portion is progressively narrower in the upward direction (see FIG. 3), has a back support 16 as a central portion in the widthwise directions (horizontal directions) of the seat back 14 and a pair of sides 18L, 18R integrally joined to respective opposite side edges of the back support 16. The sides 18L, 18R project forwardly from the front surface of the back support 16 in order to support the sides of the driver.

Figure 2:
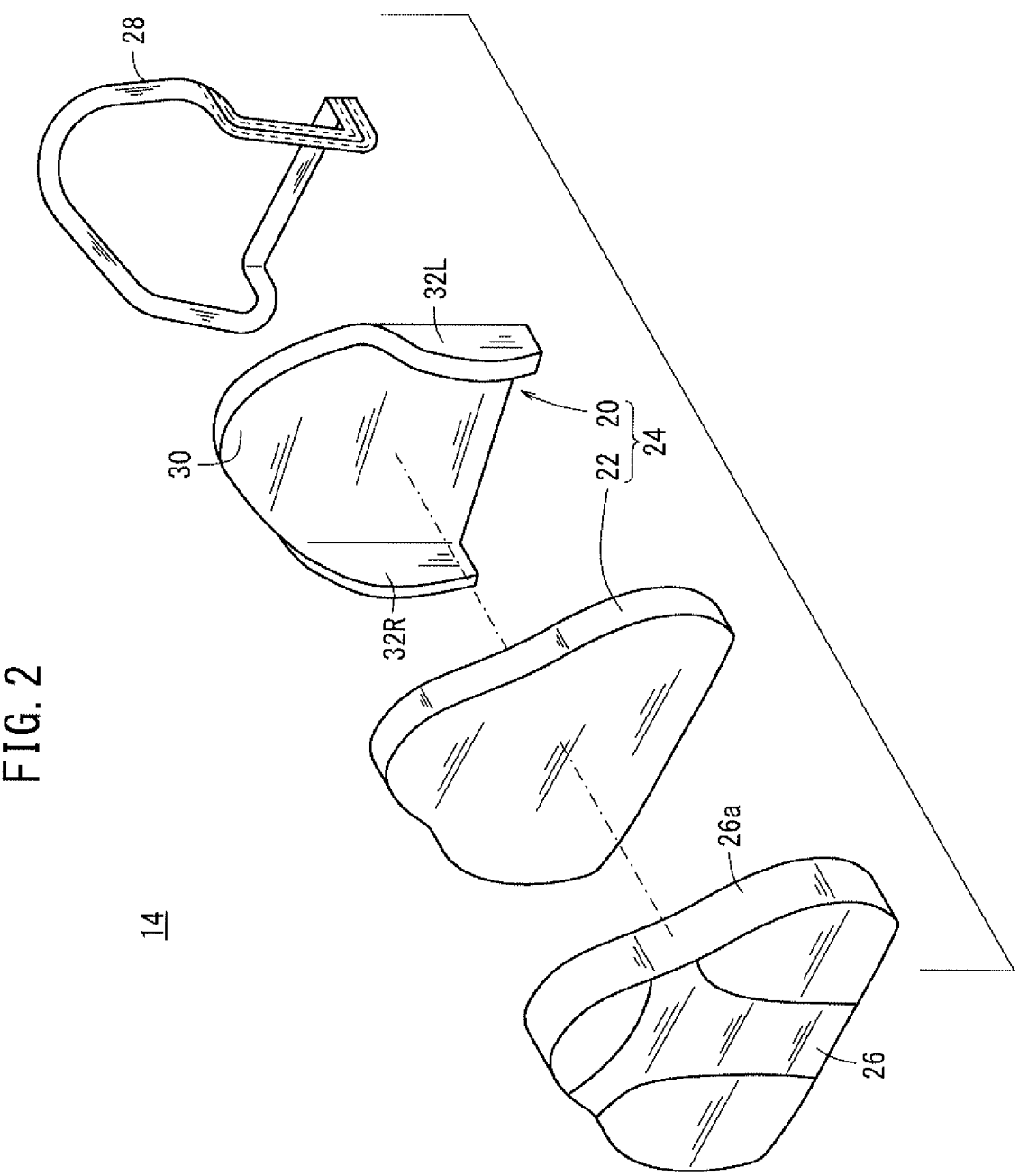
FIG. 2 is an exploded perspective view of a seat back of the vehicle seat device shown in FIG. 1.

As shown in FIG. 2, the seat back 14 has a seat base 24 including a back plate 20 and a back pad 22, an upholstery sheet 26 covering a front portion of the back pad 22, and a cover member 28 covering an end region (edge) 26a of the upholstery sheet 26.

The back plate 20, which serves as a frame of the seat back 14, is made of thermoplastic resin, wood, or the like. As can be understood from FIG. 2, the back plate 20 has a central plate 30 as a central portion in the horizontal directions of the back plate 20 and a pair of side plates 32L, 32R integrally joined to respective opposite side edges of the central plate 30. The back plate 20 has a shape that serves as the shape of the seat back 14.

The back pad 22 is disposed in covering relation to the front portion of the back plate 20. The back pad 22 is made of a flexible foamed material, e.g., PU (polyurethane) foam, PP (polypropylene) foam, PE (polyethylene) foam, or the like. The back pad 22 has a cushioning function.

The upholstery sheet 26 is disposed in covering relation to the front portion of the back pad 22. The end region 26a of the upholstery sheet 26 is folded back over the rear surface of the back plate 20, and fastened to the rear surface of the back plate 20 by a plurality of fasteners 40 to be described later (see FIGS. 3 and 5). The portion of the upholstery sheet 26 which covers the back pad 22 is thus prevented from wrinkling.

Figure 3:
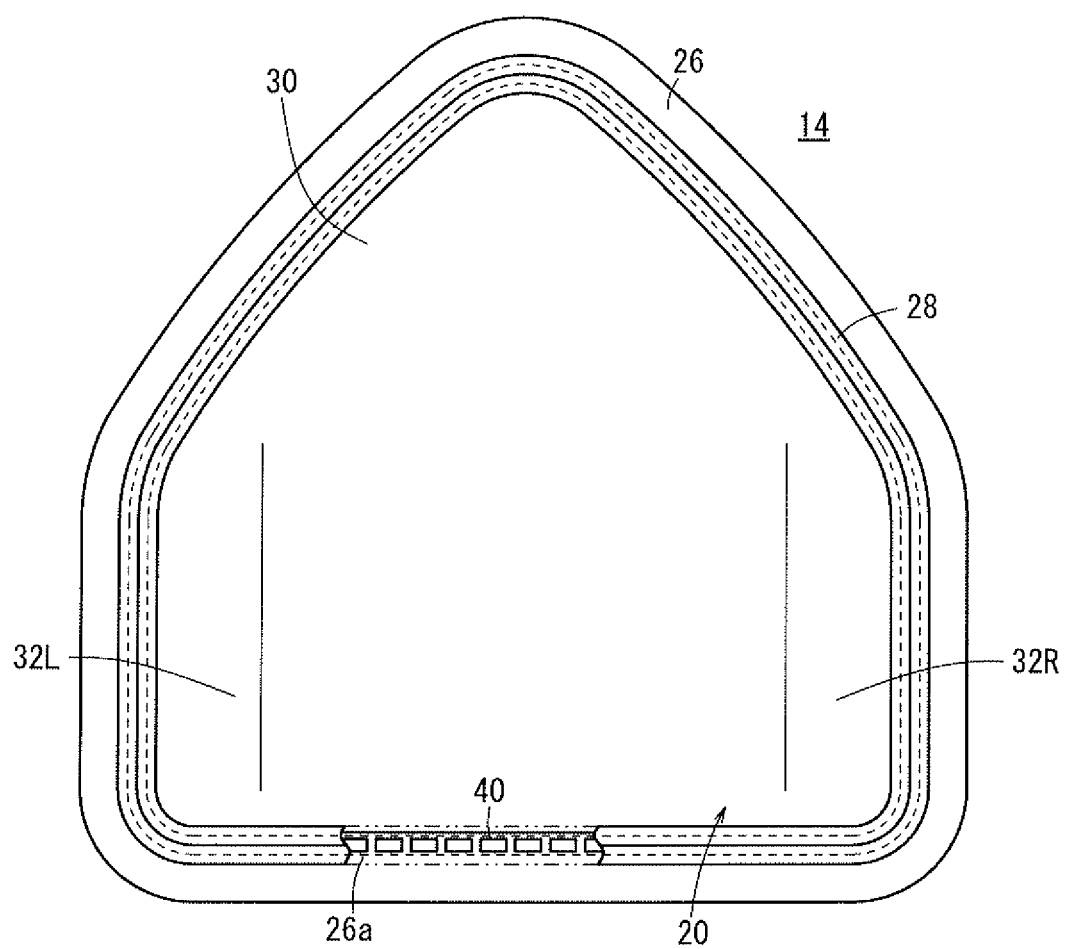
FIG. 3 is a plan view of a rear side of the seat back of the vehicle seat device shown in FIG. 1.

As shown in FIG. 3, the cover member 28 is in the form of a strip made of a soft material and covers the end region 26a of the upholstery sheet 26 almost in its entirety. The soft material of the cover member 28 may be PVC (polyvinyl chloride) leather, real leather, film, or the like. In the present embodiment, PVC leather is used as the soft material of the cover member 28.

The upholstery sheet 26 may be made of the same material as that of the soft material. If the upholstery sheet 26 and the cover member 28 are made of the same material, then they are visually indistinguishable from each other, making the seat device 10 aesthetically pleasing for better merchantability by way of appearance.

Figure 4:
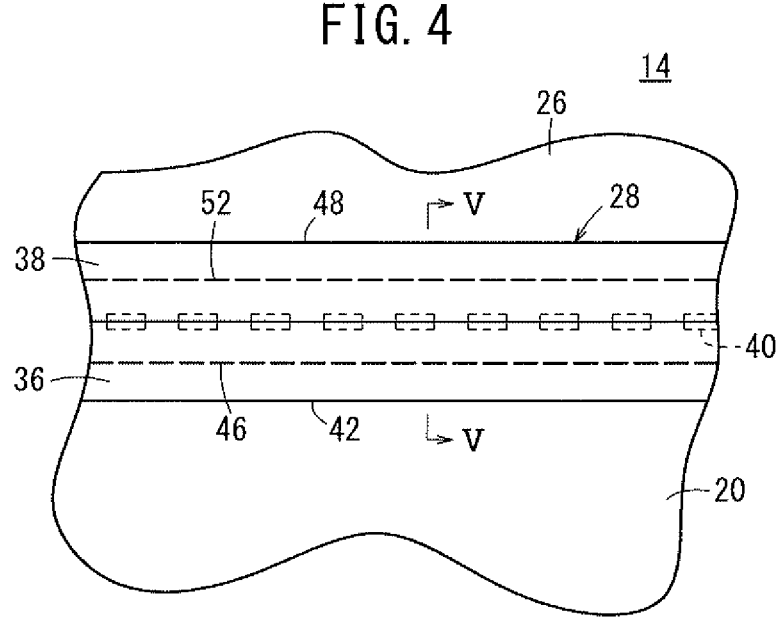
FIG. 4 is an enlarged fragmentary plan view of an edge portion of the seat back shown in FIG. 3.
Figure 5:
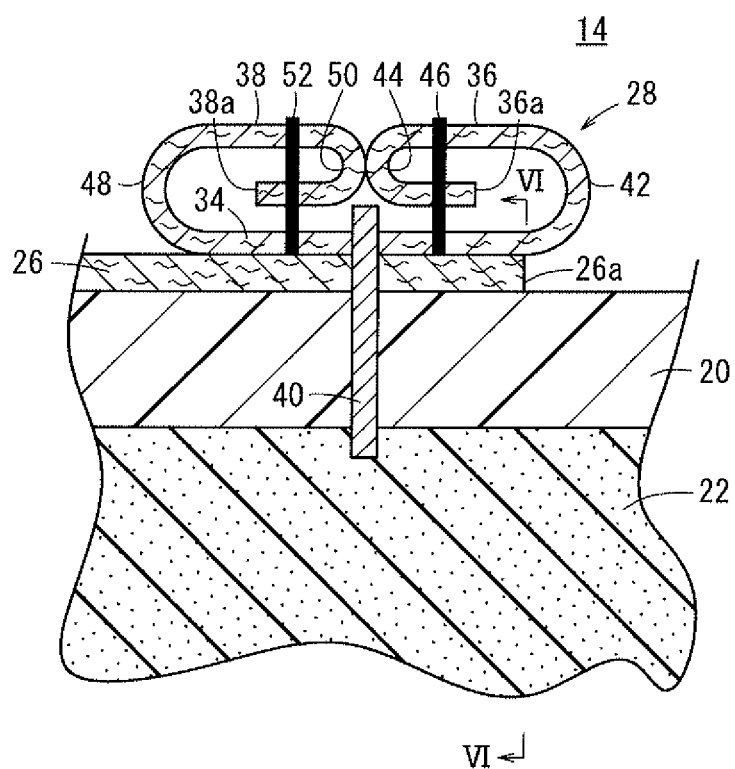
FIG. 5 is a cross-sectional view taken along line V-V of FIG. 4.

As shown in FIGS. 4 and 5, the cover member 28 has a cover body 34 for covering the end region 26a of the upholstery sheet 26, a first lip 36 formed by bending one side of the soft material inwardly toward the center of the cover body 34, and a second lip 38 formed by bending the other side of the soft material inwardly toward the center of the cover body 34.

The cover body 34 is fastened, together with the end region 26a of the upholstery sheet 26, to the back plate 20 by a plurality of the fasteners 40 that extend through a substantially central portion of the cover body 34 in the widthwise directions thereof. The fasteners 40 may comprise staples, rivets, or the like.

The first lip 36 is formed by further bending the one side of the soft material toward the cover body 34. Specifically, the first lip 36 includes a first outer bend 42 serving as a transverse edge of the cover member 28 and a first inner bend 44 positioned over a substantially central portion of the cover member 28 in the widthwise directions thereof. The first lip 36 has an edge 36a oriented toward the first outer bend 42.

The first lip 36 thus folded on itself has overlapping layers of the soft material, and those overlapping layers and the cover body 34 are stitched together by a thread 46.

The second lip 38 is formed by further bending the other side of the soft material toward the cover body 34. Specifically, the second lip 38 includes a second outer bend 48 serving as another transverse edge of the cover member 28 and a second inner bend 50 positioned over the substantially central portion of the cover member 28 in the widthwise directions thereof. The second lip 38 has an edge 38a oriented toward the second outer bend 48.

The second lip 38 thus folded on itself has overlapping layers of the soft material, and those overlapping layers and the cover body 34 are stitched together by a thread 52.

As shown in FIG. 5, the first inner bend 44 of the first lip 36 and the second inner bend 50 of the second lip 38 are held in contact with each other over the substantially central portion of the cover member 28 in the width directions. The first lip 36 and the second lip 38 thus held against each other cover the fasteners 40 from outside, and are effective to prevent the fasteners 40 on the substantially central portion of the cover body 34 in the widthwise directions thereof from being visible. Therefore, the seat device 10 is of an aesthetically neat appearance.

However, the first inner bend 44 and the second inner bend 50 may be held out of contact with each other insofar as the first lip 36 and the second lip 38 are jointly capable of partially covering the fasteners 40 to conceal the fasteners 40 from view, thereby making the seat device 10 aesthetically pleasing.

Figure 6:
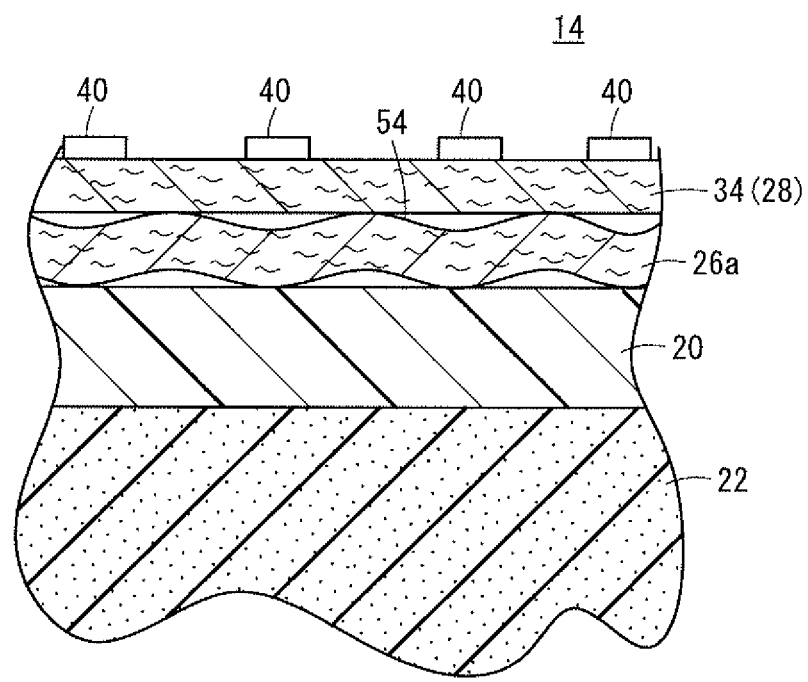
FIG. 6 is a cross-sectional view taken along line VI-VI of FIG. 5.

As shown in FIG. 6, the end region 26a of the upholstery sheet 26 is deformed into an undulating region 54 along the fasteners 40 in the seat device 10 which has above structure. According to the present embodiment, since the outer surface of the end region 26a of the upholstery sheet 26 is covered with the cover member 28, the undulating region 54 is concealed from view.

According to the present embodiment, as the cover member 28 is made of a soft material, even if the back plate 20 happens to be misshaped due to a dimensional error, the cover member 28 can be elastically deformed to conform to the shape of the edge of the back plate 20. Therefore, the cover member 28 can reliably cover or conceal the undulating region 54 on the end region 26a of the upholstery sheet 26. Furthermore, as the fasteners 40 applied to the cover body 34 are covered with the first lip 36 and the second lip 38, the fasteners 40 are concealed from view, thereby making the seat device 10 aesthetically pleasing.

Inasmuch as the cover member 28 according to the present embodiment can easily be elastically deformed in shape, it can be used on a range of back plates 20 (end regions 26a of the upholstery sheets 26) having various shapes. In other words, the cover member 28 can be used as a general-purpose product, rather than a dedicated product.

According to the present embodiment, the first lip 36 is formed by bending one side of the soft material inwardly and the second lip 38 is formed by bending the other side of the soft material inwardly.

Figure 7:
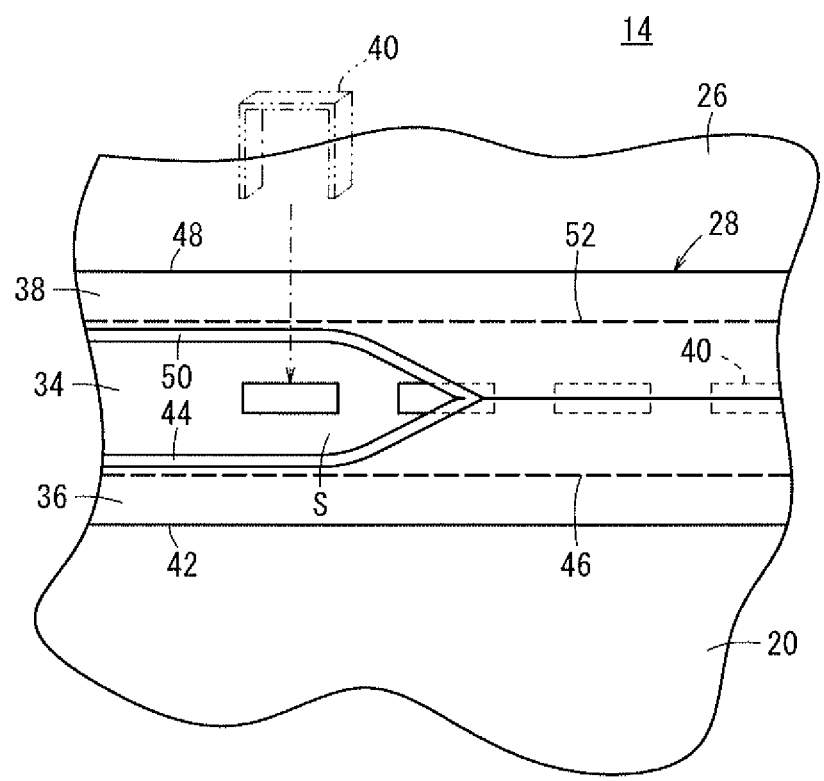
FIG. 7 is a fragmentary plan view showing the manner in which fasteners are applied to the cover member.

As shown in FIG. 7, when the first inner bend 44 of the first lip 36 is opened toward the first outer bend 42 and the second inner bend 50 of the second lip 38 is opened toward the second outer bend 48, a clearance S is created between the first lip 36 and the second lip 38 for the fasteners 40 to be inserted therethrough.

Therefore, the fasteners 40 can easily be applied substantially centrally to the cover body 34 to fasten the cover member 28. As a mold or the like is not required to fabricate the cover member 28, the seat device 10 can be manufactured at a reduced cost.

According to the present embodiment, the cover member 28 and the end region 26a of the upholstery sheet 26 are fastened together to the back plate 20 by the fasteners 40. Therefore, the seat device 10 can be manufactured less costly than if the cover member 28 and the end region 26a of the upholstery sheet 26 are fastened separately to the back plate 20.

The fasteners 40 may comprise staples that are generally used in the art. Consequently, the fasteners 40 may be hammered by a general-purpose tacker, or in other words, no dedicated tacker is required to use the fasteners 40. The fasteners 40 can thus be applied easily by an unskilled worker.

According to the present embodiment, the first lip 36 includes the first inner bend 44, and the second lip 38 includes the second inner bend 50. The one edge of the soft material is enclosed by the first lip 36 and the cover body 34, and the other edge of the soft material is enclosed by the second lip 38 and the cover body 34. As a result, both the edges of the soft material are concealed from external view, giving the seat device 10 an aesthetically neat appearance.

The overlapping layers (soft material) of the first lip 36 and the cover body 34 are stitched together by the thread 46, and the overlapping layers (soft material) of the second lip 38 and the cover body 34 are stitched together by the thread 52. Therefore, both the edges of the soft material are prevented from being exposed when the seat device 10 is in use, in a preferable manner.

According to the present embodiment, PVC leather is used as the soft material. Therefore, the first lip 36 and the second lip 38 can easily be formed to shape. The seat device 10 can thus be manufactured inexpensively, and can be given a sophisticated look.

The cover member 28 that is stitched or sewn by the threads 46, 52 has a wide range of design freedom because the width, length, thickness, touch, color, and grain (wrinkle) thereof can easily be changed, and the threads 46, 52 can also be changed in color and thickness.

Figure 8:
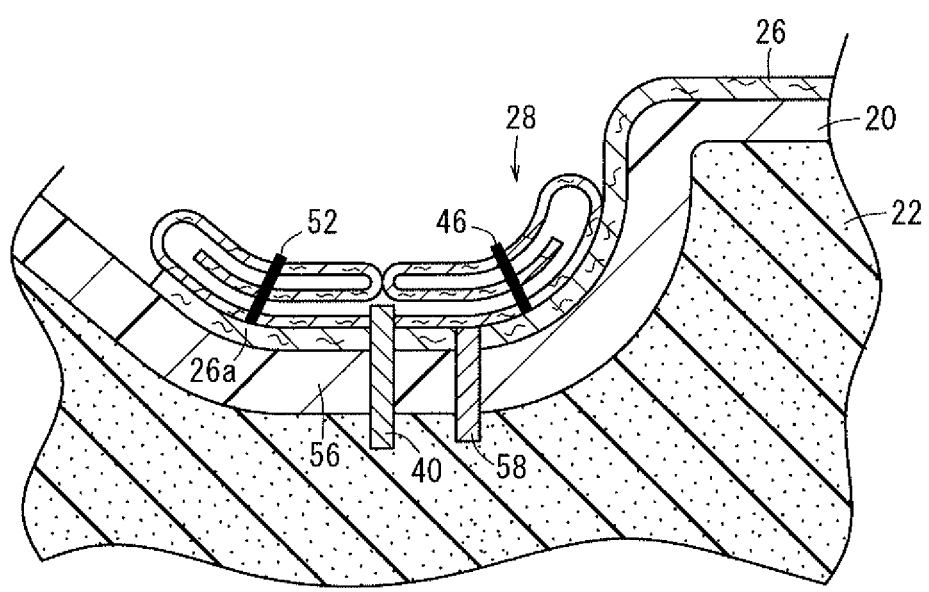
FIG. 8 is an enlarged fragmentary cross-sectional view of a vehicle seat device according to a modification.
Figure 9:
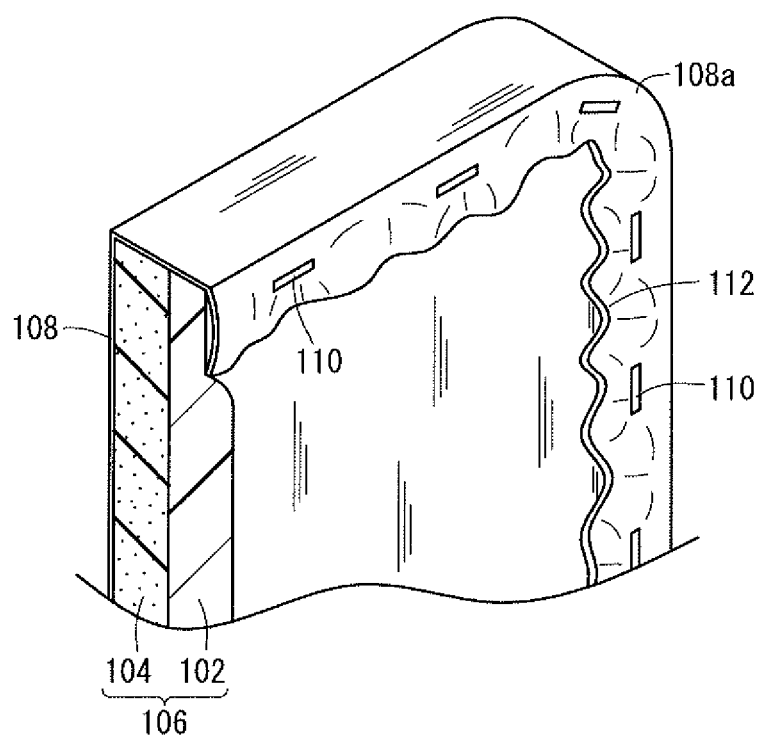
FIG. 9 is a fragmentary perspective view, partly cut away, of a seat device according to the related art.
Figure 10:
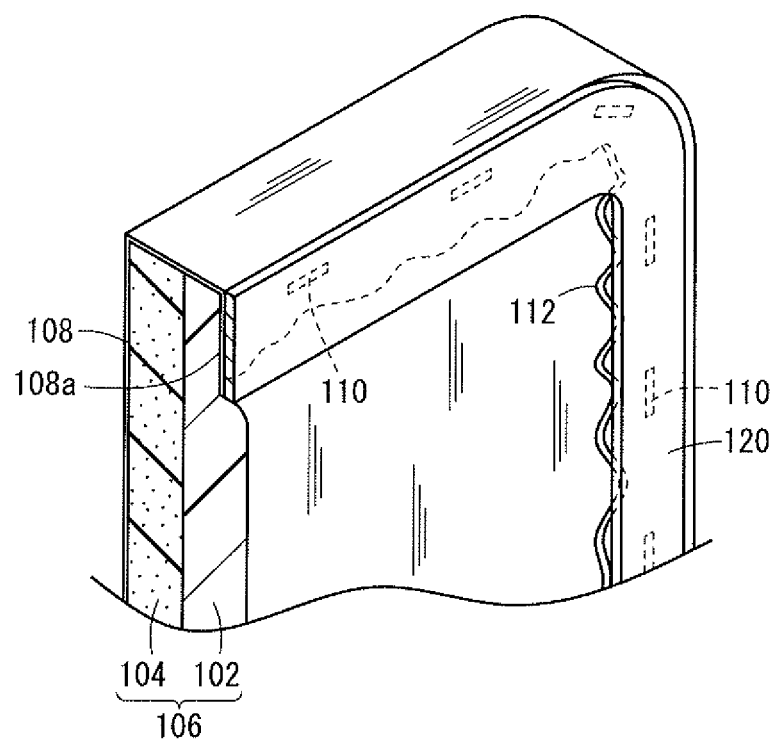
FIG. 10 is a fragmentary perspective view, partly cut away, of the seat device shown in FIG. 9 with a cover member of metal mounted thereon.
Figure 11:
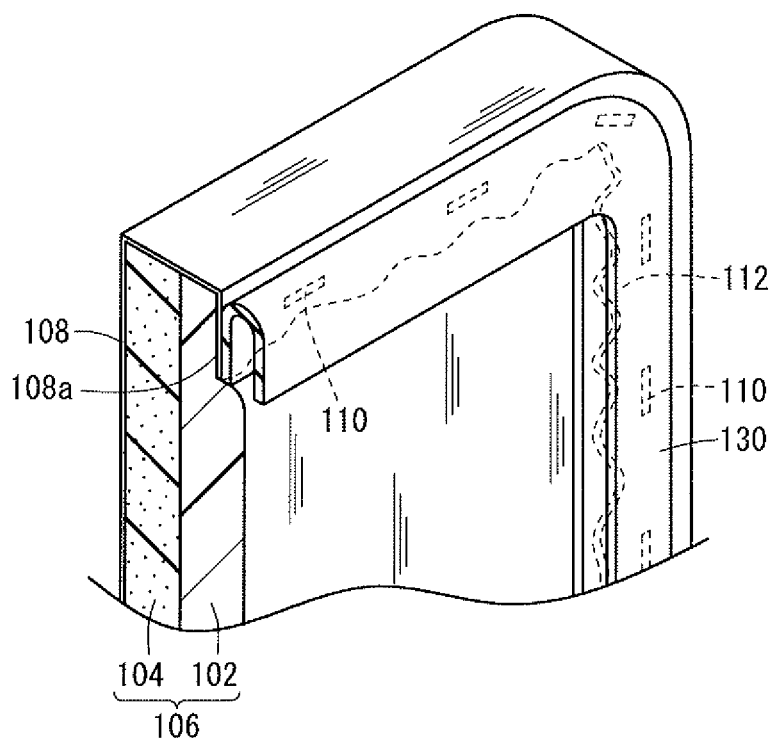
FIG. 11 is a fragmentary perspective view, partly cut away, of the seat device shown in FIG. 9 with a cover member of rubber mounted thereon.

The seat device 10 is not limited to the structural details described above. As shown in FIG. 8, the back plate 20 may have a concave wall 56 of C-shaped cross section denting into the back pad 22, with the end region 26a of the upholstery sheet 26 being disposed in the cavity defined by the concave wall 56. Even if the end region 26a of the upholstery sheet 26 is placed in the concave wall 56 of the back plate 20, since the cover member 28 is made of a soft material, the cover member 28 can easily be elastically deformed to conform to the shape of the concave wall 56.

The cover member 28 may be attached to the end region 26a of the upholstery sheet 26 in the cavity as follows: First, the end region 26a is temporarily fastened at some locations to the concave wall 56 by a plurality of fasteners 58. Then, the cover member 28 and the end region 26a of the upholstery sheet 26 are fastened together to the concave wall 56 by a plurality of fasteners 40. In this manner, the cover member 28 is fastened accurately to the back plate 20.

[Overview of Present Embodiment]

As described above, the cover member 28 according to the present embodiment which covers the end region 26a of the upholstery sheet 26 covering the seat base 24 has the following features [1] through [5]:

[1] The cover member 28 has the cover body 34 of a soft material fastenable to the seat base 24 by the fasteners 40 in covering relation to the end region 26a of the upholstery sheet 26, the first lip 36 formed by bending one side of the soft material inwardly, and the second lip 38 formed by bending another side of the soft material inwardly, wherein the first lip 36 and the second lip 38 at least partly cover portions of the cover body 34 where the fasteners 40 are to be positioned.

With the cover member 28 having the above feature [1], since the cover body 34, the first lip 36, and the second lip 38 are made of the soft material, even if the seat base 24 happens to be misshaped due to a dimensional error, the cover member 28 can be elastically deformed to conform to the shape of the seat base 24. Therefore, the cover member 28 can reliably cover or conceal the undulating region 54 of the end region 26a of the upholstery sheet 26. Furthermore, as the portion of the cover body 34 where the fasteners 40 are applied is at least partly covered with the first lip 36 and the second lip 38, the fasteners 40 are concealed from view, thereby making the seat device 10 aesthetically pleasing.

Inasmuch as the cover member 28 can easily be elastically deformed in shape, it can be used on a range of the seat base 24 (end regions 26a of the upholstery sheets 26) having various shapes. In other words, the cover member 28 can be used as a general-purpose product, rather than a dedicated product.

For attaching the cover member 28 to the seat base 24, the clearance S can easily be created between the first lip 36 and the second lip 38 for the fasteners 40 to be inserted therethrough. Therefore, the cover member 28 can easily be applied to the seat base 24. Further, as a mold or the like is not required to fabricate the cover member 28, the seat device 10 can be manufactured at a reduced cost.

[2] In the cover member 28 having the above feature [1], the first lip 36 is formed by further bending the one side of the soft material toward the cover body 34, and the second lip 38 is formed by further bending the other side of the soft material toward the cover body 34, the first lip 36 is folded on itself into overlapping layers of the soft material which are stitched to the cover body 34, and the second lip 38 is folded on itself into overlapping layers of the soft material which are stitched to the cover body 34.

With the cover member 28 having the above feature [2], one edge of the soft material is enclosed by the first lip 36 and the cover body 34, and the other edge of the soft material is enclosed by the second lip 38 and the cover body 34. As a result, both edges of the soft material are concealed from external view, giving the seat device 10 an aesthetically neat appearance.

Since the overlapping layers of the first lip 36 and the cover body 34 are stitched together and the overlapping layers of the second lip 38 and the cover body 34 are stitched together, both the edges of the soft material are prevented from being exposed when the seat device 10 is in use.

[3] In the cover member 28 having the above feature [2], the first lip 36 and the second lip 38 are capable of contacting each other.

The cover member 28 having the above feature [3] is effective to reliably prevent the fasteners 40 from being visible between the first lip 36 and the second lip 38. Therefore, the seat device 10 is of an aesthetically neat appearance.

[4] In the cover member 28 having the above feature [3], the soft material is made of the same material as that of the upholstery sheet 26.

With the cover member 28 having the feature [4], the upholstery sheet 26 and the cover member 28 are visually indistinguishable from each other, giving the seat device 10 an aesthetically pleasing appearance.

[5] In the cover member 28 having the above feature [1], the soft material should preferably be PVC leather.

With the cover member 28 having the feature [5], the first lip 36 and the second lip 38 can easily be formed to shape. The seat device 10 can thus be manufactured inexpensively, and can be given a sophisticated look.

The vehicle seat device 10 according to the present embodiment includes the seat base 24, the upholstery sheet 26 covering the seat base 24, and the cover member 28 covering the end region 26a of the upholstery sheet 26, the cover member 28 having either one of the features [1] through [5] described above.

The vehicle seat device 10 thus constructed offers the same advantages as those of the cover member 28 having the features [1] through [5] described above.

Although certain preferred embodiments of the present invention have been shown and described in detail, it should be understood that various changes and modifications may be made therein without departing from the scope of the appended claims.

What is claimed is:

1. A cover member for covering an end region of an upholstery sheet covering a seat base, the cover member being made of a soft material, the cover member comprising:
   a cover body configured to be fastened to the seat base by a fastener in covering relation to the end region of the upholstery sheet;
   a first lip formed by bending one side of the cover member inwardly; and
   a second lip formed by bending another side of the cover member inwardly;
   wherein the fastener projects from a surface of the cover body through the end region of the upholstery sheet and the cover body;
   wherein the first lip has a first inward folded portion, which is formed by further bending the one side of the cover member toward the cover body;
   wherein the second lip has a second inward folded portion, which is formed by further bending the other side of the cover member toward the cover body;
   wherein the first lip is folded on itself into overlapping layers of the cover member which are stitched to the cover body;
   wherein the second lip is folded on itself into overlapping layers of the cover member which are stitched to the cover body, and
   wherein the first lip and the second lip cover a projected portion of the fastener.

2. The cover member according to claim 1, wherein the first lip and the second lip make direct physical contact with each other.

3. The cover member according to claim 1, wherein the cover member is made of same material as that of the upholstery sheet.

4. The cover member according to claim 1, wherein the cover member comprises PVC leather.

5. The cover member according to claim 1, wherein the fastener is configured to be inserted from between the first lip and the second lip and applied to the cover body so that the first lip and the second lip cover the fastener.

6. The cover member according to claim 1, wherein a portion of the cover member covers an end region of the upholstery sheet and extends beyond the end region.

7. A cover member for covering an end region of an upholstery sheet covering a seat base, the cover member being made of a soft material, the cover member comprising:
   a cover body configured to be fastened to the seat base by a fastener in covering relation to the end region of the upholstery sheet;
   a first lip formed by bending one side of the cover member inwardly; and
   a second lip formed by bending another side of the cover member inwardly;
   wherein the first lip and the second lip at least partly cover a portion of the cover body where the fastener is to be positioned, and
   wherein the first lip and the second lip make direct physical contact with each other.

8. The cover member according to claim 7, wherein the first lip and the second lip make direct physical contact with each other at a position directly above the fastener.

9. A cover member for covering an end region of an upholstery sheet covering a seat base, the cover member being made of a soft material, the cover member comprising:
   a cover body configured to be fastened to the seat base by a fastener in covering relation to the end region of the upholstery sheet;
   a first lip formed by bending one side of the cover member inwardly; and
   a second lip formed by bending another side of the cover member inwardly,
   wherein the first lip and the second lip at least partly cover a portion of the cover body where the fastener is to be positioned,
   wherein the first lip has a first inward folded portion, which is formed by further bending the one side of the cover member toward the cover body,
   wherein the second lip has a second inward folded portion, which is formed by further bending the other side of the cover member toward the cover body,
   wherein the first lip is folded on itself into overlapping layers of the cover member which are stitched to the cover body,
   wherein the second lip is folded on itself into overlapping layers of the cover member which are stitched to the cover body, and wherein the fastener is positioned between a stitched portion of the first lip and a stitched portion of the second lip.

10. The cover member according to claim 9,
wherein the fastener projects from a surface of the cover body through the end rejoin of the upholstery sheet and the cover body, and
wherein ends of the stitched portions on a side of the seat base are positioned closer to the seat base than a projected end of the fastener.

* * * * *